July 12, 1938.  C. J. E. ELIASON  2,123,598
FISHHOOK
Filed Oct. 3, 1936
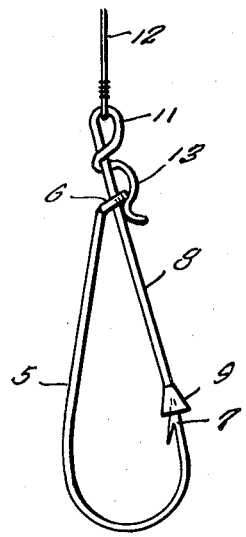
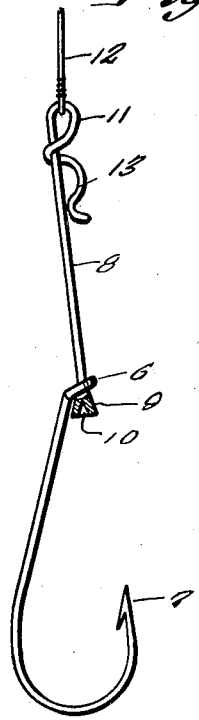
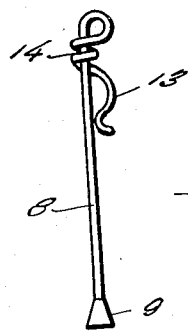
Inventor
C. J. E. Eliason
By Clarence A. O'Brien
Hyman Berman
Attorneys Patented July 12, 1938

2,123,598

UNITED STATES PATENT OFFICE 2,123,598

FISHHOOK

Carl J. E. Eliason, Sayner, Wis.

Application October 3, 1936, Serial No. 103,941

4 Claims. (Cl. 43—38)

The present invention relates to fish hooks and has for its principal object to provide means for protecting the point of the hook to prevent the same from becoming snagged and from hooking weeds and other obstacles while in use.

A further object is to provide an article of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:—

Figure 1 is an elevational view showing the hook in its retracted position.

Figure 2 is a similar view showing the hook in extended position and

Figure 3 illustrates a modified form of latch member.

Referring now to the drawing in detail, wherein for the purpose of illustration I have disclosed a preferred embodiment of the invention, the numeral 5 illustrates a conventional type of hook which includes an eye 6 and barbed pointed end 7. The eye 6 is slidably mounted on a guide 8 having a conical head 9 at its lower end provided with a recess 10 in its end portion for accommodating the pointed end 7 of the hook as illustrated in Figure 1 of the drawing.

The guide 8 is preferably formed of wire and has its upper end bent to form an eye 11 to which the fish line 12 is attached, a portion of the wire being bent spirally around the guide 8 and the extremity shaped to form a catch 13 for the eye 6 of the hook.

In the form of the invention illustrated in Figure 3 of the drawing the wire is wound one or more times around the guide 8 to form convolutions 14 for the purpose of strengthening the catch.

When using the hook constructed in accordance with the present invention, after the same has been baited, the eye 6 is moved inwardly of the slide and engaged by the catch 13 so that the hook is protected by the conical head 9. In such position it is impossible for the hook to become entangled in weeds and other obstacles. When the bait is followed by the fish the hook will be released from the catch 13 thereby exposing the pointed end 7 of the hook to perform its usual function of catching the fish. The enlarged head 9 on the guide prevents removal of the hook therefrom.

It is believed the construction, merit and advantages of the invention will be readily understood from the foregoing without further detailed explanation.

Having thus described the invention, what is claimed is:

1. In combination, a fish hook having an eye at one end and a point at its other end, a guide, said eye being slidable on said guide, a catch engaging the eye to releasably retain the hook in retracted position with respect to the guide and a guard on the lower end of said guide for the pointed end of the hook.

2. In combination, a fish hook having an eye at one end and a barbed hook at its opposite end, a guide providing a slidable mounting for said eye, said guide having a catch formed at its upper end releasably engaging said eye to retain said hook in retracted position and a conical head on the lower end of said guide preventing removal of the eye, said head having a recess in its end to protect said hook when in retracted position.

3. In combination, a fish hook having an eye at one end and a point at its other end, a guide having a line attaching eye at one end and a guard at its lower end for the point of the hook, said eye of the hook being slidable on the guide and a catch on the guide engaging the eye of the hook for releasably retaining the hook in retracted position with respect to the guide.

4. The combination of a fish hook having a pointed end, a guide adapted to be connected at its rear end with a line, said guide slidably engaged with the heel portion of the hook and carrying a guard movable on and off the point of the hook, and a latch carried by one of said elements and arranged to engage a portion of the other element to releasably retain the guard on the hook point.

CARL J. E. ELIASON.